(12) United States Patent  
Reeve

(10) Patent No.: US 8,913,864 B2  
(45) Date of Patent: Dec. 16, 2014

(54) APPARATUS AND METHOD FOR PREVENTING OPTICAL FIBER AND GEL FROM EJECTING OUT OF BUFFER TUBES IN FIBER OPTIC CABLES

(75) Inventor: David Reeve, Taylors, SC (US)

(73) Assignee: AFL Telecommunications LLC, Spartanburg, SC (US)

(*) Notice: Subject to any disclaimer, the term of this patent is extended or adjusted under 35 U.S.C. 154(b) by 0 days.

(21) Appl. No.: 13/578,668

(22) PCT Filed: Aug. 2, 2011

(86) PCT No.: PCT/US2011/046280  
§ 371 (c)(1),  
(2), (4) Date: Aug. 13, 2012

(87) PCT Pub. No.: WO2012/018825  
PCT Pub. Date: Feb. 9, 2012

(65) Prior Publication Data  
US 2013/0034331 A1 Feb. 7, 2013

Related U.S. Application Data

(60) Provisional application No. 61/369,897, filed on Aug. 2, 2010.

(51) Int. Cl.  
*G02B 6/44* (2006.01)  
*G02B 6/00* (2006.01)

(52) U.S. Cl.  
CPC .................................. *G02B 6/4467* (2013.01)  
USPC .......................................... 385/109; 385/135

(58) Field of Classification Search  
USPC ............................................................ 385/109  
See application file for complete search history.

(56) References Cited

U.S. PATENT DOCUMENTS

| | | | |
|---|---|---|---|
| 5,239,609 A | 8/1993 | Auteri | |
| 5,825,963 A * | 10/1998 | Burgett | 385/135 |
| 6,856,748 B1 | 2/2005 | Elkins, II et al. | |
| 7,127,143 B2 * | 10/2006 | Elkins et al. | 385/100 |
| 2002/0061170 A1 * | 5/2002 | Wu et al. | 385/58 |
| 2002/0186947 A1 * | 12/2002 | Abe et al. | 385/128 |
| 2008/0118205 A1 | 5/2008 | Furuyama | |

OTHER PUBLICATIONS

International Search Report of PCT/US2011/046280, dated Dec. 8, 2011.

* cited by examiner

*Primary Examiner* — Omar R Rojas  
(74) *Attorney, Agent, or Firm* — Sughrue Mion, PLLC

(57) ABSTRACT

An apparatus for connecting buffer tubes including a first block, a second block, and a fastener for assembling said first and second blocks. The blocks contain a pair of tube grooves and a cavity and a and a hole leading into the cavity. A sealant is then inserted into the cavities and allowed to cure.

7 Claims, 7 Drawing Sheets

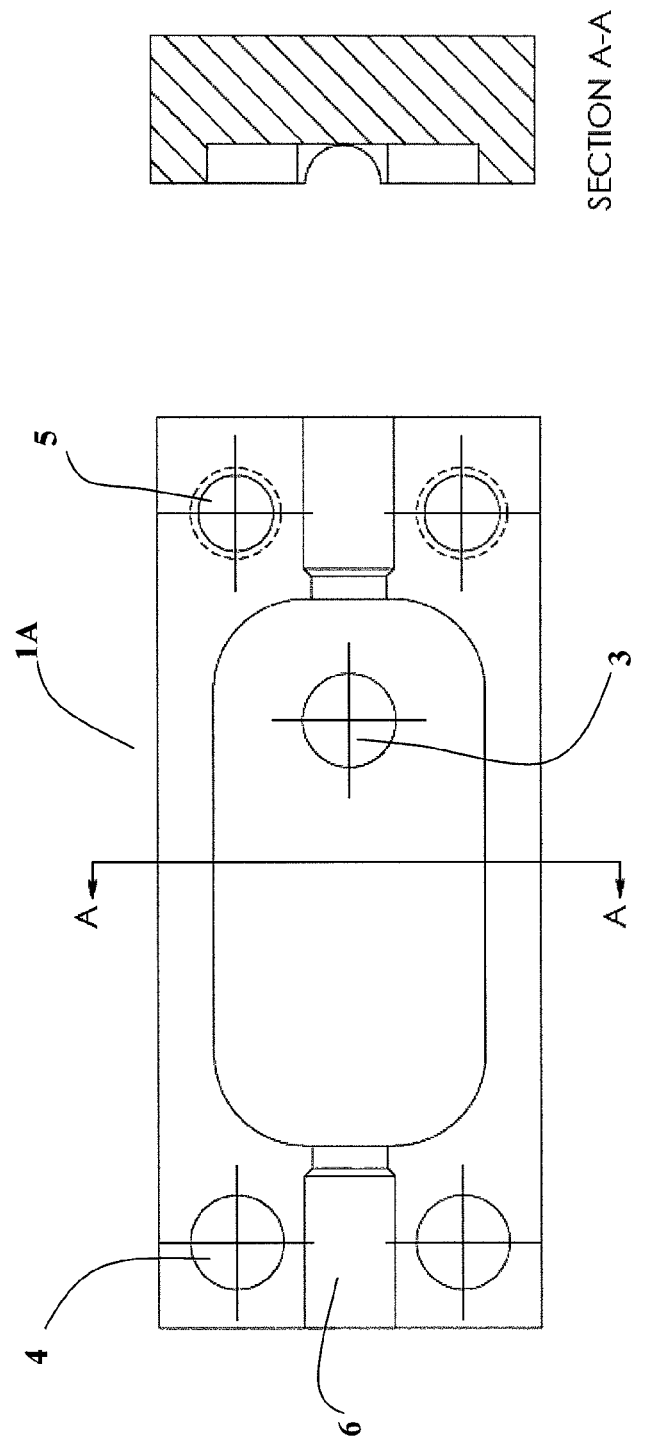

Step 1 - cut buffer tube

Step 2 - separate buffer tubes

Step 3 - clean buffer tubes and fiber(s)

Step 4 - place buffer tubes in one block

Step 5 - assemble blocks

Step 6 - fasten blocks together

Step 7 - fill cavity and allow sealant to cure

Figure 7

APPARATUS AND METHOD FOR PREVENTING OPTICAL FIBER AND GEL FROM EJECTING OUT OF BUFFER TUBES IN FIBER OPTIC CABLES

CROSS-REFERENCE TO RELATED APPLICATIONS

This application is based upon and claims the benefit of priority from U.S. Provisional Application No. 61/369,897, filed Aug. 2, 2010 in the United States Patent and Trademark Office, the disclosure of which is incorporated herein in its entirety by reference.

BACKGROUND

1. Field

The invention is related to an apparatus and method for preventing the filling compound (gel) optical fiber from ejecting, flowing or protruding out of buffer tubes in fiber optic cables.

2. Related Art

Many utilities, city municipals and telephone companies deploy systems that use fiber optic cable. Many fiber optic cables contain buffer tubes that are manufactured with a filling compound (gel). The purpose of the gel is to protect the fibers and act as a water blocking agent to prevent water from tracking into the buffer tubes and damaging the fibers and or fiber performance. Three of the typical types of cables used are: OPGW: Optical Ground Wire uses both plastic and or stainless steel buffer tubes (Aerial applications); ADSS: All Dielectric Self Supporting cable containing plastic buffer tubes (Aerial applications); and Loose Tube: Multiple cable designs containing plastic buffer tubes (Non-aerial applications).

Buffer tubes contain a filling compound that allows the fibers to float within the tube. The gel also helps allow the buffer tubes to store an, excess fiber length or "EFL." EFL is the term used when talking about the length of the fiber within the buffer tube compared to the actual length of the buffer tube. The excess length of fiber within the tube helps determine the point at which the fiber will see strain. The fiber optic cables are typically installed and terminated within a splice enclosure. The splice enclosure is used to help protect the exposed fibers and buffer tubes from all types of elements. An AFL Telecommunications "SB01" splice enclosure is a good example of an enclosure that is used in an aerial application.

After the fiber optic cable has been secured within the splice enclosure, the buffer tubes are routed within the enclosure and the fibers are then terminated (spliced) within a fiber optic splice tray.

Fiber optic cable may be deployed in several harsh or non-standard environments world wide. Two such environments are Extreme Heat and Vertical Installations. In rare applications, optical fiber may migrate or flow out the ends of the buffer tubes. The issue is not typical but can occur due to the viscosity of the filling compound (gel), amount of fibers within the buffer tube versus the inner diameter, vertical installation length and extreme or sustained temperatures while in a vertical position. If a fiber optic product shows signs of migration, the gel and fiber will begin to push its way into the splice enclosure and tray. The end result for this action can be the loss of EFL, bending, kinking or breaking of optical fibers and a possible overall failure to the optical system.

Due to the abundance of fiber optic cable being installed world wide for communications needs, it has become extremely important to maintain and protect the functionally of our fiber optic networks. For this reason, it is vitally important to have a product and procedure in place that will prevent the filling compound and optical fibers from migrating out of the buffer tubes.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is an apparatus for connecting buffer tubes including a first block, a second block, and a fastener for assembling the first and second blocks. The first block includes a pair of tube grooves, a cavity and a hole leading into the cavity. The second block includes a pair of tube grooves, and a cavity.

In the apparatus, the second block may also include a hole leading into the cavity.

In the apparatus the second block may be identical to the first block.

In the apparatus the first and second blocks may each include four fastener holes.

In the apparatus two of the fastener holes on each of the first and second blocks may be threaded.

Another embodiment of the invention is a method of connecting buffer tubes that includes cutting a buffer tube into two sections, separating the buffer tube sections, placing the buffer tube sections into a pair of grooves on a first block, placing a second block on top of the first block, wherein the buffer tube sections are placed into a pair of grooves on the second block, fastening the first and second blocks together, filling a sealant through a hole in said first block into a cavity formed between the first and second blocks and allowing the sealant to cure.

The method may also include cleaning the buffer tube sections and a fiber in the buffer tube prior to placing the buffer tube sections into the pair of grooves in the first block.

BRIEF DESCRIPTION OF THE DRAWINGS

FIG. 2 is a plan view of an embodiment of a block.
FIG. 3 is a cross-section view of an embodiment of a block.
FIG. 7 is a flow chart of an embodiment of a method of the invention.

DETAILED DESCRIPTION

Figure 1:
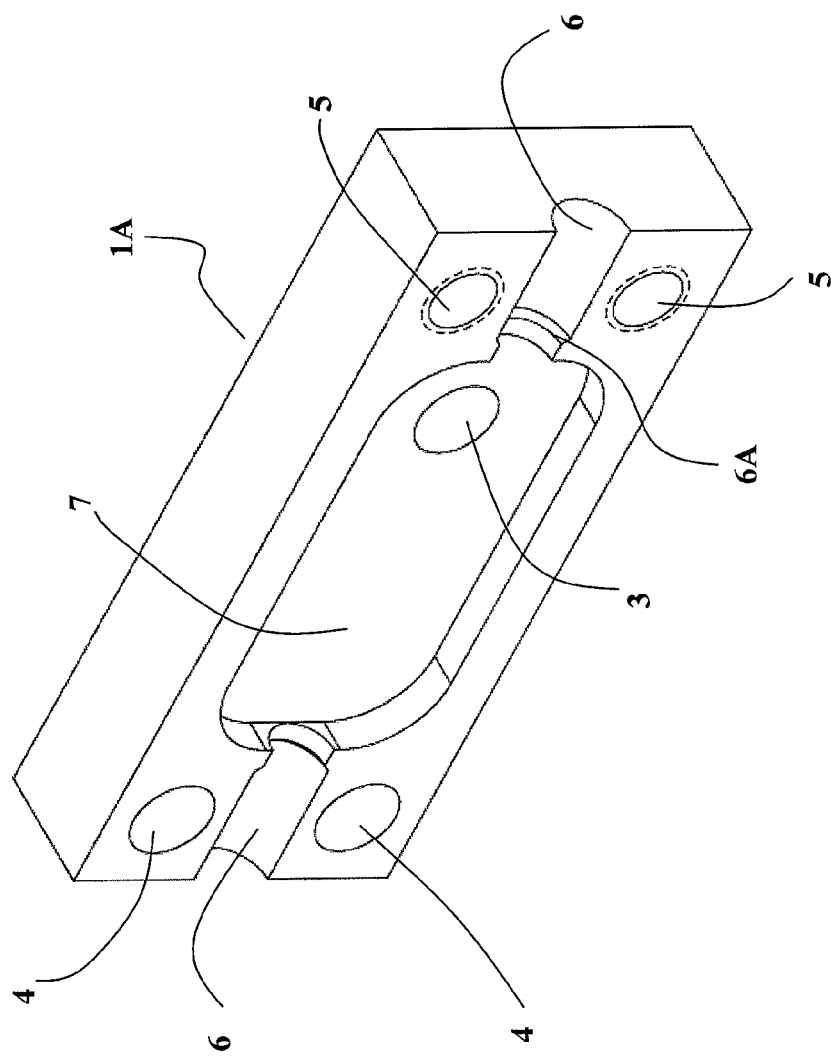
FIG. 1 is a perspective view of an embodiment of a block.
Figure 4:
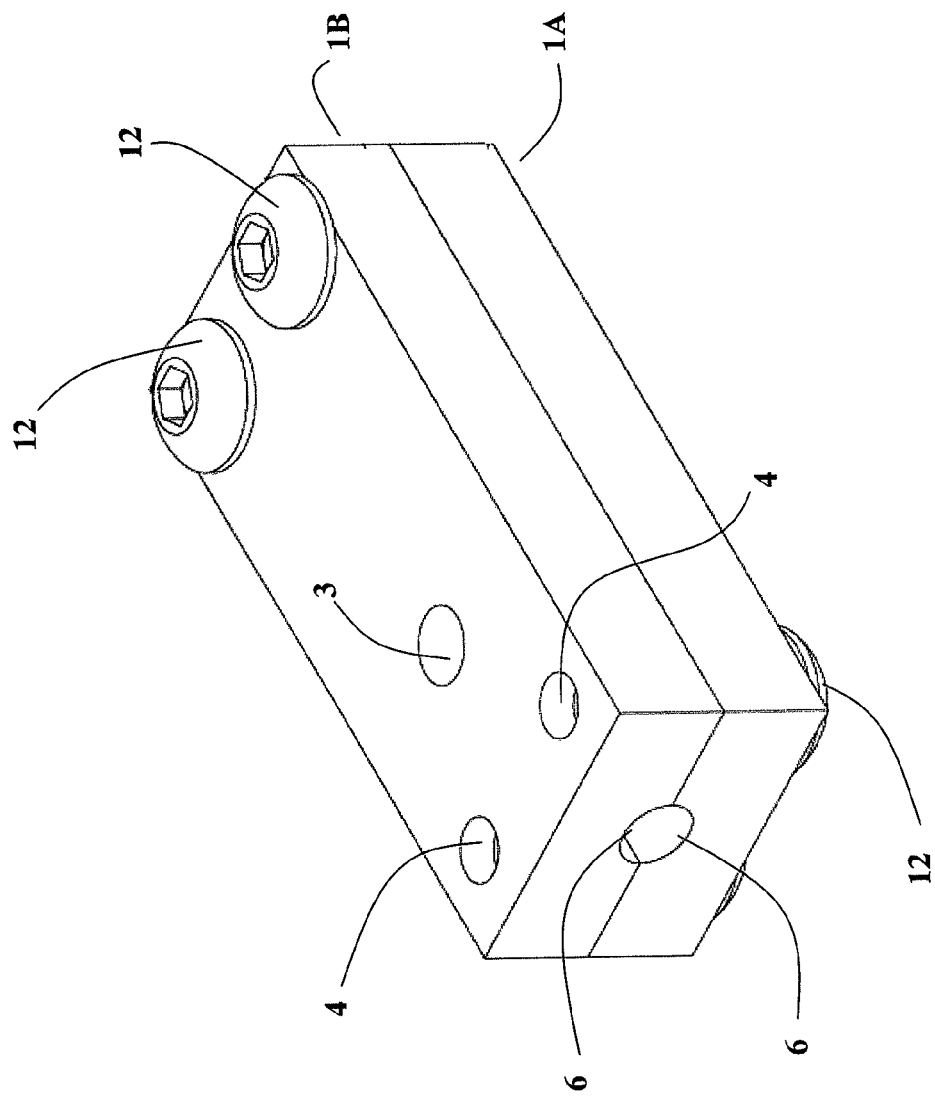
FIG. 4 is a perspective view an embodiment of two assembled blocks.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

The invention is a mechanical solution to prevent filling compound (gel) and optical fibers from migrating out of buffer tubes found in fiber optic cable designs. It is a clever way of solving potential issues caused by the flow of gel and optical fibers within a splice enclosure.

The method can also be used as a retro-fit solution for an existing splice location that has exhibited the migrating issues. The method can potentially be applied without re-routing or re-splicing the optical fibers.

FIGS. 1-5 show an embodiment of the invention that can be used on a fiber optic buffer tube. Note that while the description describes the invention being used with fiber optic cables, the invention is not limited to fiber optic cable and also be used with wired cables. The apparatus consists of two blocks 1A and 1B. In a preferred embodiment, the block is made of aluminum; however, it could be made of other materials, such as plastic, steel, ceramic, glass, rubber, etc. In addition, in this embodiment, blocks 1A and 1B are identical, which can reduce manufacture costs. However, the blocks do not have to be identical. In this particular embodiment, the blocks are 30 mm long by 12.7 mm wide by 4.8 mm deep; however, the block is not limited to these dimensions. The block includes four fastener holes, 4, 5. In this embodiment, holes 4 are threaded, and holes 5 are not threaded. This allows a fastener 12, such as an M3 8 mm screw, to be inserted into hole 5 and then screwed into hole 4 when the blocks are assembled. However, all of the holes could be smooth and the blocks could be assembled by nuts and bolts. In addition, other known fastening methods could be used such as hinging one side of the blocks and fastening the other sides of the blocks.

The block also includes a filling/exit hole 3 and a cavity 7. When the blocks are assembled, a sealant can be inserted into one filling/exit hole and can exit the other filling/exit hole 3 after the cavity 7 has been filled.

The cavity in this particular embodiment is approximately 18 mm long by 7.5 mm wide by 1.3 mm deep; however, the cavity is not limited to these dimensions.

The block also has two tube grooves 6 into which buffer tubes are inserted. The diameter of the grooves 6 are slightly smaller than the diameter of the buffer tubes to ensure a tight fit.

Figure 6:
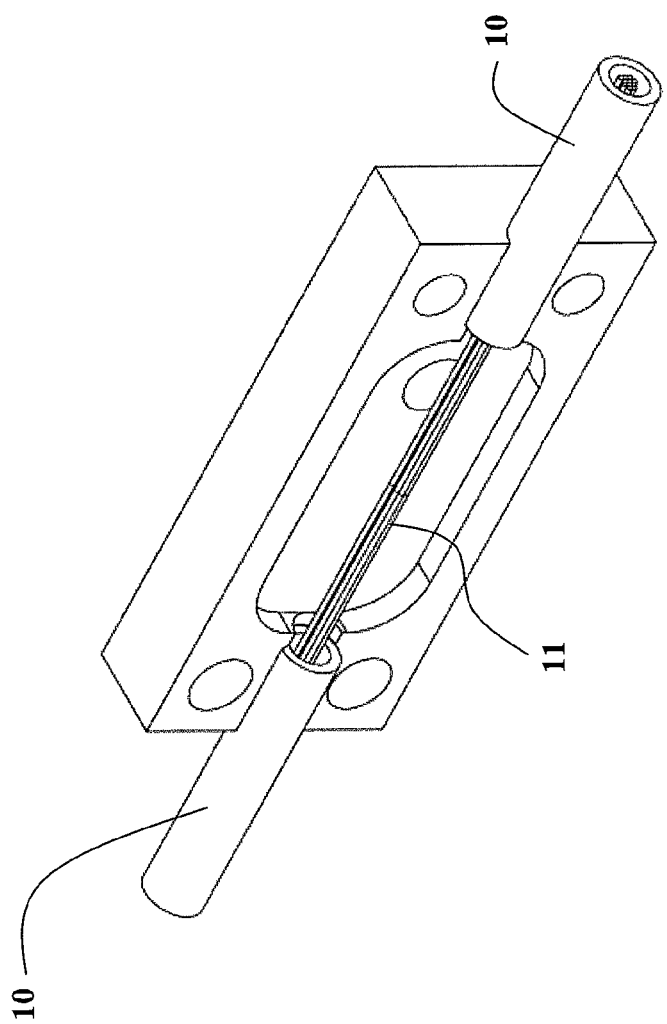

Next, a method a assembling the block on a buffer tube cable will be explained. See also FIG. 6.

Depending on the type of enclosure selected, a decision should be made in determining the distance needed from the enclosure to the ring cut locations on the buffer tubes. The blocks should be applied at a distance long enough away from the enclosure to prevent long term kinking or damage to the optical units within the enclosure. In step 1, the buffer tube 10 should be ring cut.

In step 2, the buffer tubes 10 should then be pulled apart approximately 20 mm to reveal the fibers. Note that the fibers in the buffer tubes are not cut.

In step 3 any waterblock gel is removed from the fibers using a standard solvent spray cleaner and cloth. Ensure that the buffer tubes are clean and all fibers are clean and intact. Ensure that the fibers have dried before proceeding to the next step. Note that the invention may work without the buffer tubes and fibers being cleaned; however, long term performance may be comprised due to the lack of adherence between the cured sealant and un-cleaned fibers.

Figure 5:
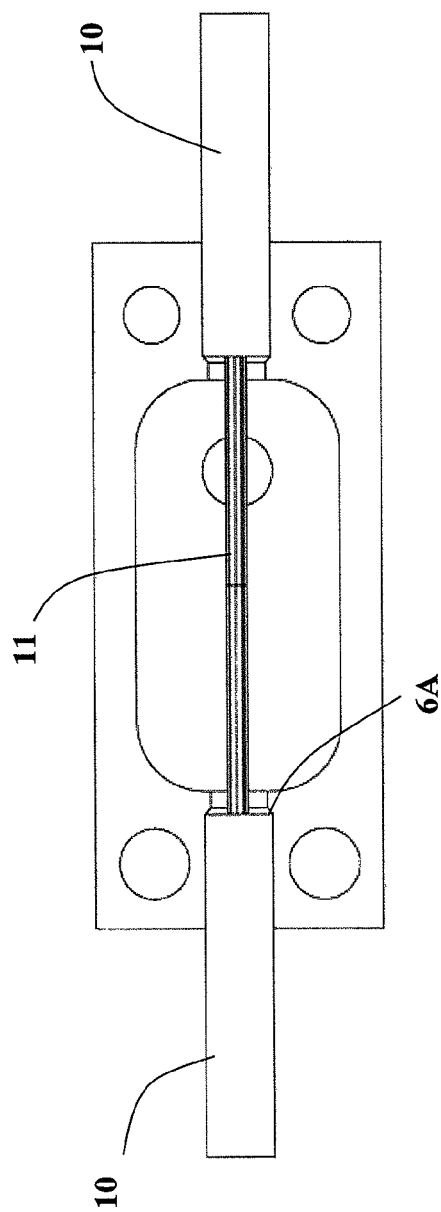
FIGS. 5 and 6 are a plan view and a perspective view an embodiment showing buffer tubes in a block.

In step 4, ensuring that each end of the tube is clean and dry, offer up the first block 1A to tubes 10. The ends of the tube should be flush with the edge of the cavity 7, and the fibers 11 should be straight as shown in FIG. 5. Alternatively, the buffer tube can be flush with an edge 6A of the groove.

In step 5, position the second block 1B over the tubes, ensuring that the filling hole is at the opposite end to the first block 1A. Push the blocks together to trap the buffer tube in place, ensuring the optical fibers are not trapped between the meeting surfaces.

In step 6, fasten the blocks together. In this particular embodiment, at each corner of the block insert screws through the plane side of each hole and use an M3 hexagonal key to tighten.

In step 7, the cavity is filled with a sealant, such as a 10:1 ratio 2-part silicone sealant. A gun applicator can be used to fill the cavity 7. Prior to filling, a piece of cloth can be pressed against one of the filling/exit holes 3, blocking that hole. The applicator is then placed in the other filling/exit hole 3 and the cavity 7 is filled with the sealant. There should be a pressure build up at the blocked filling/exit holes and when the cloth is removed, the excess sealant should flow out of the hole. This excess sealant can be wiped away using the cloth. Then lightly pull on the fibers located next to the entrance of the tray to release any possible movement of the fibers that may have occurred during the sealant injection. The sealant is then allowed to cure.

Once the sealant cures, future tube/fiber migration should be prevented.

This solution was also tested to see how it would affect the performance of the fibers. The test includes, temperature soaking the migration repair at extreme temperatures of −40° C. and 85° C. and aged by cycling between 37° C. and 49° C. The blocks 1A and 1B were assembled and filled with 2-part silicone sealant as per the methods described above.

Figure 8:
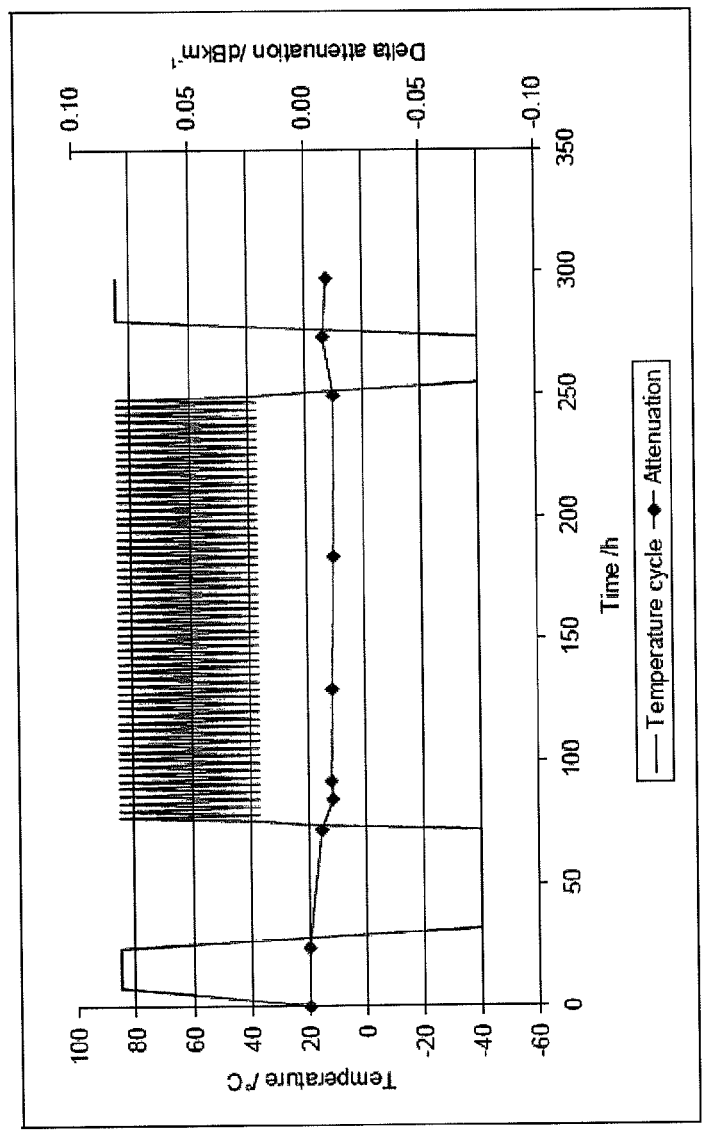
FIG. 8 is a graph showing test results of an embodiment of the invention.

The results of the temperature cycling are shown in FIG. 8. The retro-fit solution was applied to each end of four buffer tubes found within the OPGW cable. Six fibers from each tube were concatenated by means of fusion splices to form an optical loop. The total fiber length under test was approximately 700 m. The cable was temperature cycled as follows:

Soak @ −40° C. for 24 h
Soak @ 85° C. for 24 h
Cycled between 37° C. and 49° C. for 1 week (3 h per cycles)
Soak @ −40° C. for 24 h
Soak @ 85° C. for 24 h.

The change in attenuation per splice was less than 0.05 dB/km and therefore, the retro-fit solution as tested met the requirements of the test both optically and visually, no fiber migration was observed.

The solution is to be used at splice enclosures where potential fiber migration is expected or observed. If the fiber migration is already present, the application may be applied without breaking the existing fibers.

As mentioned above, although the exemplary embodiments described above are directed to fiber optic cables, this is merely exemplary and the general inventive concept should not be limited thereto, and could be used with wired cables (e.g., coaxial cables) and corresponding wired cable interface components and equipment.

What is claimed:

1. A method of connecting buffer tubes comprising:
    cutting a buffer tube into two sections;
    separating said buffer tube sections;
    placing said buffer tube sections into a pair of grooves on a first block;
    placing a second block on top of said first block, wherein said buffer tube sections are placed into a pair of grooves on said second block;

fastening said first and second blocks together;
filling a sealant through a hole in said first block into a cavity formed between said first and second blocks and allowing said sealant to cure.

2. The method of claim 1, further comprising cleaning said buffer tube sections and a fiber in said buffer tube prior to placing said buffer tube sections into said pair of grooves in said first block.

3. The method of claim 1, wherein said second block comprises a second hole leading into the cavity.

4. The method of claim 1, wherein said second block is identical to said first block.

5. The method of claim 1, wherein said first and second blocks each comprise four fastener holes.

6. The method of claim 5, wherein two of said fastener holes on each of said first and second blocks are threaded.

7. The method of claim 1, wherein said first and second blocks are arranged such that the first hole of the first block is offset from the second hole of the second block.

\* \* \* \* \*